March 6, 1956     V. E. GUSTISON     2,737,317
FERTILIZER SPREADER

Filed Aug. 11, 1952     2 Sheets-Sheet 1

VIRGIL E. GUSTISON
INVENTOR

BY Smith & Tuck

March 6, 1956 V. E. GUSTISON 2,737,317
FERTILIZER SPREADER
Filed Aug. 11, 1952 2 Sheets-Sheet 2
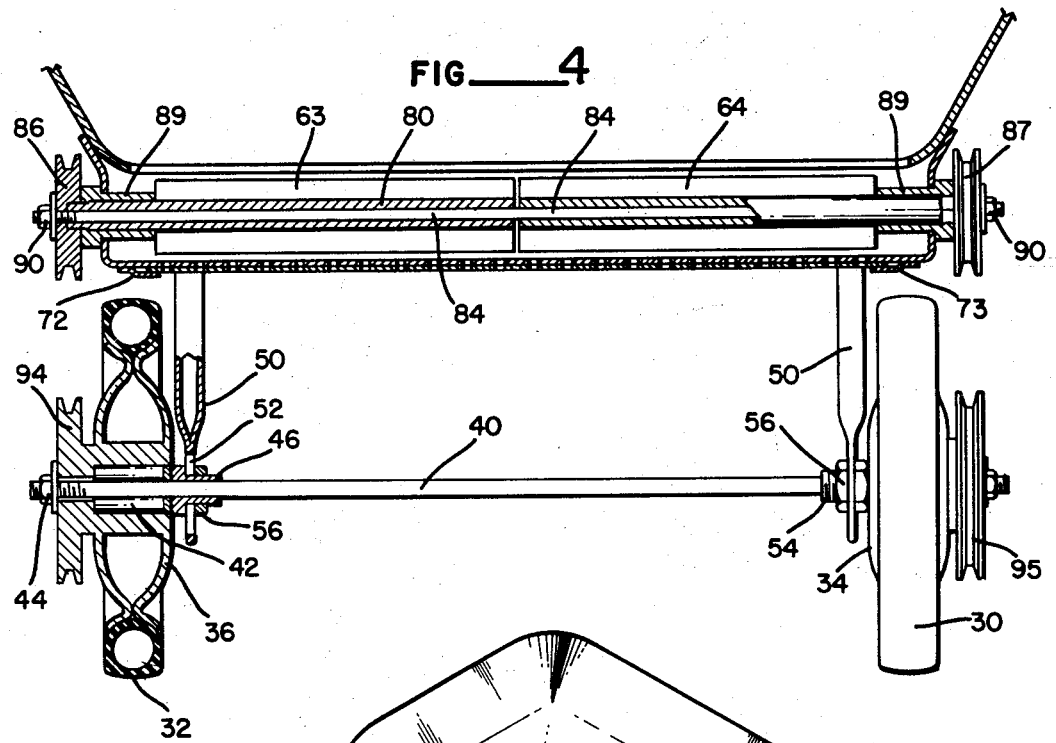
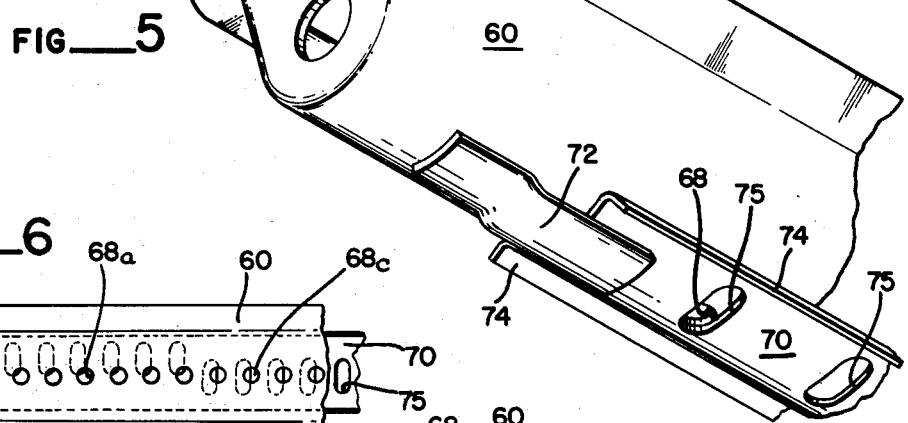
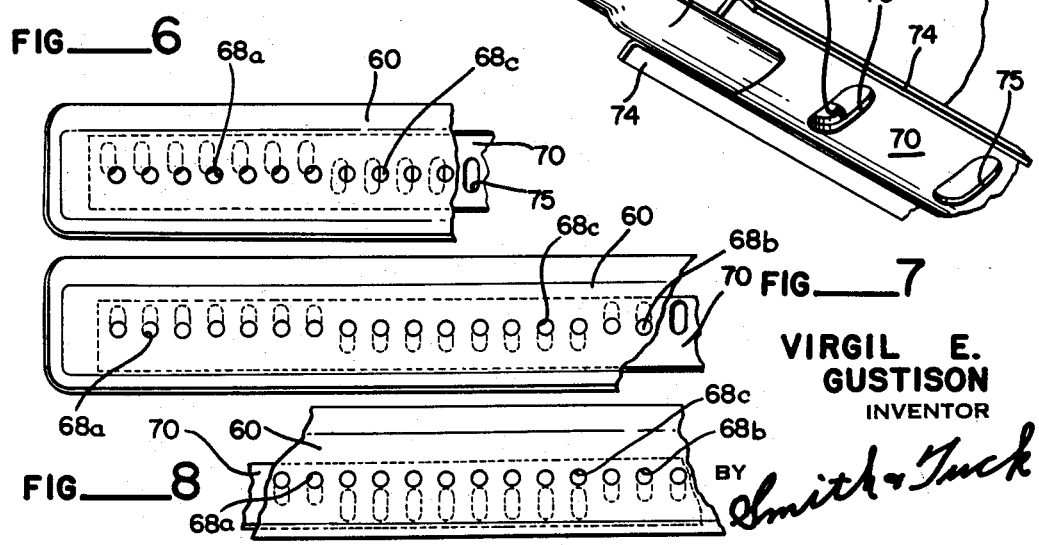
VIRGIL E. GUSTISON
INVENTOR
BY Smith & Tuck United States Patent Office 2,737,317
Patented Mar. 6, 1956

2,737,317

FERTILIZER SPREADER

Virgil E. Gustison, Bellevue, Wash.

Application August 11, 1952, Serial No. 303,662

8 Claims. (Cl. 222—177)

This present invention contemplates a fertilizer spreader embodying certain parts common to wheelbarrows. It employs as a carrying hopper for the fertilizer a conventional type of wheelbarrow body. It further uses the conventional form of wheelbarrow handles and tubular rest members as employed in wheelbarrows, particularly of the lighter weight types. The proportioning of these parts, namely the frame, and the pan or hopper, has been very well determined over long periods of use and they are very convenient for the average person. One point of difference between this present invention and the conventional wheelbarrow however is the preferred employment of two wheels instead of the usual single wheel. This arrangement contributes many worthwhile characteristics to this fertilizer spreader as will be more fully brought out in the specification. A slotted portion is provided at the break between the front and bottom surfaces of the wheelbarrow body and disposed immediately below this is an agitating means and means for controlling the amount of the fertilizer distributed. The agitator, preferably of the multivane type, is divided into two parts, and each of these separate halves is independently driven by a flexible belt or chain each from one of the supporting wheels employed.

In the past many forms of fertilizer spreaders have been offered to the individual user for hand operation. The types of spreaders provided have been of two extreme types, on one hand is a very cheaply made device having a small hopper disposed quite close to the ground and then a handle extending up from this unit to a convenient height. Such devices can be made to work to a degree under ideal conditions but for serious work under a wide variety of conditions they do not provide convenient operation and further they give no real assurance of uniform spreading of the fertilizer. Certain types of spreaders have been provided which are quite efficient in operation but which are unwieldly, very expensive, and still very difficult to use except under ideal conditions. In this present invention full use has been made of the long time development of the wheelbarrow and certain of its parts and most of its advantages have been retained in the present equipment. It has been found desirable to depart from the single wheel in favor of the double wheel in order to maintain greater stability in the unit, particularly on sideling ground, and further to insure that the fertilizer will be dropped from a uniform height without the necessity of the operator having to carefully balance the same to achieve this result.

An important object of this present invention is to provide a fertilizer spreader which makes fullest use of the desirable characteristics of the wheelbarrow to the end that it can be conveniently and easily operated and further can be constructed for a nominal cost.

A further object of this invention is to provide a wheelbarrow type of fertilizer spreader in which two supporting wheels are employed in order to insure uniformity of spreading the fertilizer.

A further object is the provision of driving the fertilizer agitator, which in effect meters to a degree the amount of fertilizer dispensed, from the supporting wheels of the wheelbarrow.

A further object of this invention is to provide an implement for hand use which can be employed in off-seasonal periods for the same purpose and with the same and added convenience as a conventional wheelbarrow.

A further object is the provision of a drive for the agitator means which will reduce the amount of fertilizer distributed by that portion of the agitator driven by the pivoting wheel when making a turn.

A further object is to provide means for closing the distributing opening to the desired amount by a shutter so arranged that, by suitable adjustment, fertilizer can be dropped only from the center of the device, or, with the center closed, from the two end portions of the device, or the entire device may be employed at one time.

Further objects, advantages and capabilities will be apparent from the description and disclosure in the drawings, or may be comprehended or are inherent in the device.

In the drawings:

Figure 4 is a substantially vertical sectional view taken along the broken line 4—4 of Figure 2;

Figure 5 is a perspective view with certain parts broken away showing the agitator enclosing hopper together with the shutter means employed in adjusting the discharge from the same;

Figure 1:
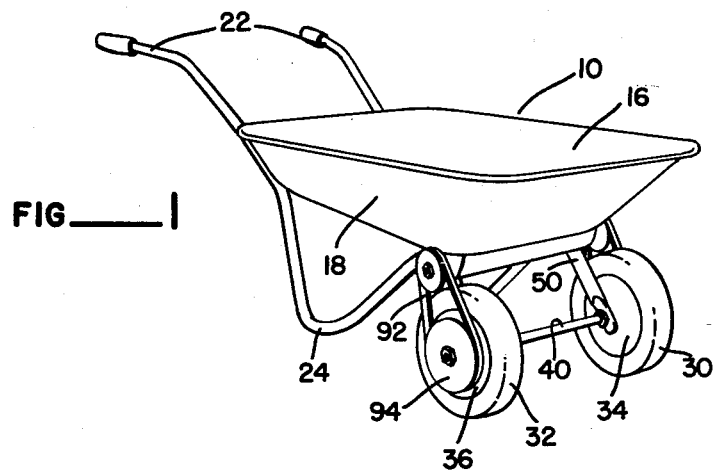
Figure 1 is a perspective view illustrating a fertilizer spreader made after the teachings of this present invention.

Figures 6, 7, and 8 are fragmentary views showing the elements illustrated in Figure 5 in their various adjusted positions.

Referring more particularly to the disclosure in the drawings, the numeral 10 designates the body or tray of the wheelbarrow. This member is formed normally as a unitary pressed form having the substantially flat bottom 12 and a rearwardly sloping front surface 14. Surfaces 12 and 14 are joined together by sloping sides 16 and 18 and a rear portion, usually of limited extent, 20. The general form of a wheelbarrow body has been well developed through usage over a long period and is normally provided with a relatively deep front portion and correspondingly shallow rear portion so that when the wheelbarrow is being used with the handles 22 elevated sufficiently to raise the rest 24 off the ground the top surface 28 is normally horizontal. With this form of construction both surfaces 12 and 14 slope downwardly when in use to their juncture point and this relationship could be definitely preserved in this fertilizer spreader so that the materials will either naturally gravitate to this juncture line or by jarring on the handles 22 the materials can be made to walk down to this line.

The modern wheelbarrow is almost universally equipped with a pneumatic tire 30, or as in this particular instance, with two such tires 30 and 32. With the advent of the pneumatic tire, much heavier loads can be wheeled normally due to the fact that the rubber tire will roll over obstructions that would normally stop the user if he were using a solid wheel such as the steel wheels formerly used. The ability to carry heavier loads has called for placing the wheel of the conventional wheelbarrow substantially under the point of maximum loading instead of well out in front of the tray as was so common in the older style of barrows. In this present instance it is very desirable to use this newer placement of the wheel or, in this case, the two wheels as 34 and 36.

The wheels are revolvably disposed upon a fixed shaft 40 and it is generally most common to employ antifriction bearings as are indicated at 42. The wheels may be held in their position on shaft 40 by any convenient means as by the nuts 44 and suitable washers disposed between them and their respective wheel hubs. One form of supporting shaft 40 that has proven very satisfactory and is in quite common use is to have the tubular frame members which terminate in handles 22 extend under the tray to form first the rest portions 24 and then to have downwardly extending portions which are preferably flattened after the showing of Figure 4 so as to engage and support shaft 40. For this present use it has been found desirable to use bushing members as 46 so as to provide on one hand a spacing member for wheels 34 and 36, and to further give a larger bearing surface upon which to make the engagement between the downwardly extending portions 50 of the tubular members. Near the ends of support members 50 the tube form is pressed together to form a flat member which in turn is slotted as at 52. Flanged bushings 46 are externally threaded at 54 so that lock nuts 56 may be employed to clamp bushings 46 in their adjusted position and to thus in turn establish the vertical position of shaft 40. This is a desirable construction for reasons which will appear subsequently.

Disposed beneath tray 10 and on the line of juncture between surfaces 12 and 14, is a hopper 60 which serves as an immediate reservoir for fertilizer and also provides a housing for a rotary agitator as the vaned members 63 and 64. Immediately above hopper 60 the bottom of tray 10 is cut away to provide the opening 66 so that fertilizer gravitating to this juncture line from either surfaces 12 or 14 will normally keep hopper 60 full as long as there is fertilizer in the tray. Disposed at the bottom of hopper 60 is a plurality of discharge openings 68. While these openings may be of any shape it has been found expedient to employ round openings disposed in a single line, but preferably quite close together and of such a size that the maximum delivery of fertilizer, that could be used in the extreme cases, can be effected.

Slidably disposed and capable of limited rotation is a shutter or valving member 70. This member is curved to fit the outside curve of hopper 60 and is secured to the same by means of two clips 72 and 73. These clips limit the sliding movement of shutter 70 to the maximum that can be used, and further, because of the outwardly curved side portions 74 of shutter 70, these same clips which are secured to hopper 60 limit the rotation of shutter 70 to the extremes that can be used. It will be noted particularly in Figure 5 that clips 72 and 73 are offset with one portion secured to hopper 60 as by riveting or welding thereto while the other end is sufficiently offset to provide a resilient retainer but still permit adjustable movement of the shutter.

In using a fertilizer spreader there are many times when the same is used with row crops, and it may be desirable to have the fertilizer distributed only at the central portion of hopper 60 or it might be, in straddling a row, that it would be desirable to have the distribution effected only at the end portions of the hopper and have the central portion closed; the extreme condition being where an even distribution of fertilizer is desired over the whole area in which case the whole length of hopper 60 should be used. To achieve these various objects, the arrangements illustrated in Figures 6, 7, and 8 has been found to be a very excellent solution. It is to be noted that the holes 68 in the bottom of hopper 60 are round holes disposed in a single line. On the other hand, the shutter openings, and there is one corresponding opening in the shutter for each opening in the hopper bottom, should be formed as slots 75. In referring to Figure 7 it will be noted that the slots in the shutter 70 provide for the free discharge from openings 68. This provides for the maximum delivery of fertilizer throughout the length of hopper 60. In Figure 8 is shown where only the two ends of the hopper are discharging. This is effected by offsetting or staggering the slots 75 of shutter 70. Consequently in Figure 8 it will be noted that the discharge openings 68a and 68b have free discharge. In Figure 6 a further development of the control effected by the shutter 70 is illustrated. In this instance it will be noted that shutter 70 has been moved somewhat lengthwise with respect to hopper 60 to the end that the end group of discharge openings 68a are almost entirely shut off, giving but very limited discharge. This would also hold true for the opposite end in which the end openings 68b would be similarly shut off. The central group of openings 68c is substantially half-open as will be noted in Figure 6. It therefore follows that by proper rotation of shutter 70 with respect to hopper 60 a degree of control of the opening is provided particularly as illustrated in Figures 7 and 8. Further by having the rotation of shutter 70 in any adjusted position, control of discharge can be effected by the longitudinal shifting of shutter 70. It therefore follows that either of these two arrangements may be used separately or together and thus a very unusual range of controls is effected which gives the user full control of the amount and the places from which the fertilizer will be discharged. It will be noted that the openings and slots in hopper 60 and shutter 70 could be reversed and the same result obtained. In other words, shutter 70 could have a single row of openings and hopper 60 could have three groups of slots with the intermediate group of slots staggered in relation to the end groups and the same metering action would be obtained by adjustment of the position of shutter 70.

Figure 3:
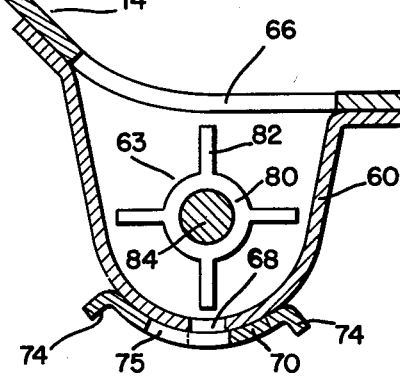
Figure 3 is a fragmentary cross-sectional view in elevation taken along the line 3—3 of Figure 4.

In order to prevent bridging over by the fertilizer and the clogging of the various discharge openings 68 it has been found desirable to employ an agitator such as the rotary agitator as illustrated in Figure 3. A preferred construction of this agitator is illustrated in Figure 4 in which it will be noted that in effect the agitator is made in two portions as 63 and 64, each of which is formed as a tube 80 having a plurality of vanes 82. Further it will be noted in Figure 4 that to insure alignment, both agitators are mounted upon axially disposed shaft 84. Each of rotors 63 and 64 is provided with its own driving sheave as 86 and 87. One form of desirable mounting is shown in Figure 4, in which bearings are provided at 89 so that bearings of some length will be available even though the same are supported from the sheet metal of hopper 60. Sheaves 86 and 87 are fixedly secured to their respective rotors 63 and 64 and the entire units are held as an operating unit by nuts 90 on each of the opposite ends of shaft 84.

Figure 2:
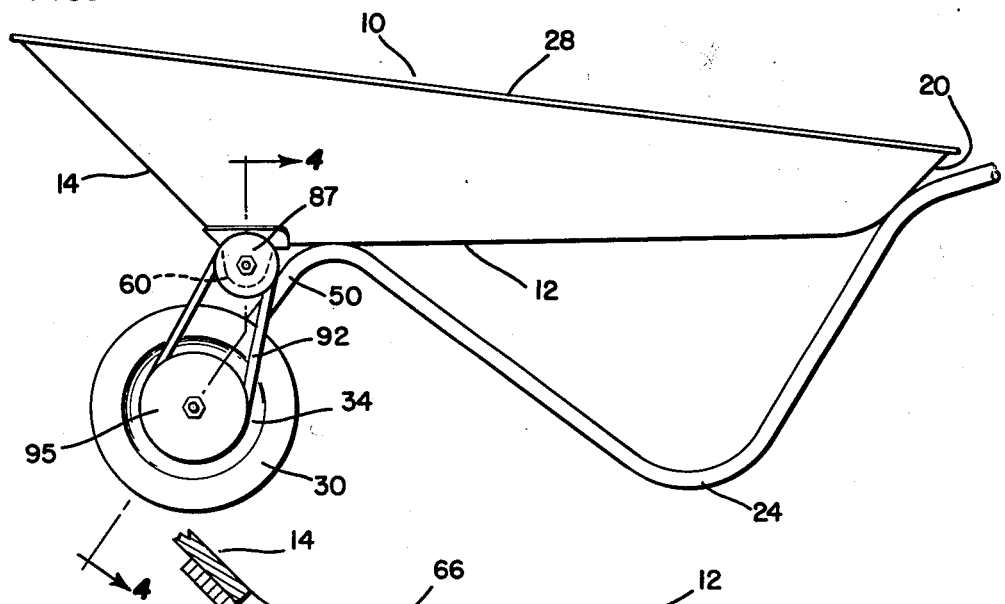
Figure 2 is a side elevation with certain portions of the handles broken away.

Sheaves 86 and 87 are preferably driven by flexible V-belts after the showing at 92 in Figure 2. These belts engage sheaves 94 and 95 which are fixedly secured to the hubs of wheels 34 and 36 respectively. This arrangement of having each of the wheels drive a separate rotor as 63 and 64 makes it possible to prevent the depositing of excess fertilizer when a turn is being made because as one wheel pivots there is little if any movement of rotor 63. However turns are usually not made at the full pivot although there will be some travel of the pivoting wheel but it will turn much slower than the outside wheel, consequently there is an approximate equalization of the amount of fertilizer distributed over the entire surface without any excess at the turns.

Using a resilient belt as 92 it is desirable to have tightening means for the same. This is provided by slots 52 and associated locking nuts which make it possible to move the shaft up and down. It also provides means for sufficiently loosening belts 92 so that they can be entirely removed and to this end they are disposed outside of the wheels so that when the belts are removed the wheelbarrow can be used for any normal use of load carrying.

In most cases it is desirable to have a closure member for opening 66, or in some cases because of the normal light structure of wheelbarrows of this order, it is quite expeditious to employ a second tray 10 which is merely put in place inside of the original tray. This prevents the fertilizer tray being soiled or damaged and adds strength to the tray structure.

It is believed that it will be clearly apparent from the above description and the disclosure in the drawings that the invention comprehends a novel construction of a fertilizer spreader.

Having thus disclosed the invention, I claim:

1. A fertilizer spreader, comprising: a wheelbarrow body of the conventional type including a metal body and handles, said body having side and bottom walls disposed to funnel materials therein to the lowermost bottom portion near the front of said body, said body having a large slot in said lowermost bottom portion extending from side to side of said body; a hopper depending from said body under said slot, said hopper being elongated and extending the length of said slot, the bottom of said hopper having a series of openings aligned longitudinally thereof; an elongated valving shutter positioned to cover said bottom; securing means for said shutter permitting adjustment of said shutter to various positions longitudinally and transversely of said series of openings; said shutter having a series of elongated slots disposed with their major axes running transversely of said shutter, said series of slots being spaced the same distance apart as said series of openings, said slots being divided into a first and a second group of slots at the ends of the series and aligned longitudinally of said shutter and a third group of slots in the center of the series which slots throughout the most of their extents are staggered with relation to the slots of said first and second groups but have one end lapping said first and second groups in line longitudinally of said shutter so that in one position all of said slots are in full registry with said series of openings; an agitator in said hopper and wheel means supporting said body and means connecting said wheel means to said agitator to power the same.

2. A fertilizer spreader, comprising: a wheelbarrow body of the conventional type including a body and handles, said body having side and bottom walls disposed to funnel materials therein to the lowermost bottom portion near the front of said body, said body having discharge opening means in said lowermost bottom portion extending from side to side of said body; a hopper depending from said body under said discharge opening means, said hopper being elongated and extending the length of said discharge opening means; an elongated plate-like valving shutter positioned to cover the bottom surface of the base of said hopper; securing means for said shutter permitting adjustment of said shutter to various positions longitudinally and transversely of the base of said hopper; said shutter and said base having metering means therebetween running longitudinally of said hopper and including in one a series of openings lying on a common line and in the other a series of elongated slots spaced the same distance apart as said series of openings, said slots being divided into a first and second group of slots at the ends of the series and aligned longitudinally of said hopper and a third group in the center of the series which slots throughout the most of their extents are staggered with relation to the slots of said first and second groups but have one end lapping said first and second groups in line longitudinally of said hopper so that in one position all of said slots are in full registry with said series of openings; said body having wheels on opposite sides, a pair of agitators positioned in said hopper at opposite sides of the middle thereof and means connecting each agitator to the wheel on its side so that said agitators are rotated independently of one another and at a speed in proportion to the speed of rotation of its associated wheel.

3. In a fertilizer spreader including a mobile body and a hopper thereon, the improvement, comprising: said hopper having in its base a series of openings extending from side to side and lying on a common line; an elongated plate-like valving shutter positioned to cover the bottom surface of said base in the area of said openings; securing means for said shutter permitting adjustment of said shutter to various positions longitudinally and transversely of said series of openings; said shutter having a series of elongated slots disposed with their major axes running transversely of said shutter, said series of slots being spaced the same distance apart as said series of openings, said slots being divided in a first and a second group of slots at the ends of the series and aligned longitudinally of said shutter and a third group of slots in the center of the series which slots throughout the most of their extents are staggered with relation to the slots of said first and second groups but have one end lapping said first and second groups in line longitudinally of said shutter so that in one position all of said slots are in full registry with said series of openings.

4. A fertilizer spreader, comprising: a wheelbarrow body of the conventional type including a metal body and handles, said body having side and bottom walls disposed to funnel materials therein to the lowermost bottom portion near the front of said body, said body having a large slot in said lowermost bottom portion extending from side to side of said body; a hopper depending from said body under said slot, said hopper being elongated and extending the length of said slot; an elongated plate-like valving shutter positioned to cover the bottom surface of the base of said hopper; securing means for said shutter permitting adjustment of said shutter to various positions longitudinally and transversely of the base of said hopper; said shutter and said base having metering means therebetween running longitudinally of said hopper and including in one a series of openings lying on a common line and in the other a series of elongated slots spaced the same distance apart as said series of openings, said slots being divided into a first and a second group of slots at the ends of the series and aligned longitudinally of said hopper and a third group in the center of the series which slots throughout the most of their extents are staggered with relation to the slots of said first and second groups but have one end lapping said first and second groups in line longitudinally of said hopper so that in one position all of said slots are in full registry with said series of openings.

5. In a fertilizer spreader including a mobile body and a hopper thereon, said hopper being elongated in a direction from side to side of said mobile body, the improvement, comprising: an elongated, normally-stationary valving shutter forming a single sheet of material positioned to cover the bottom surface of the base of said hopper and extending from side to side thereof; said shutter and said base having metering means therebetween extending longitudinally of said shutter and including in one a series of openings lying on a common line extending longitudinally of the shutter and in the other a series of slots spaced the same distance apart as said series of openings, said slots being elongated laterally of said shutter and being divided into a first and a second group of slots at the ends of the series and aligned longitudinally of said shutter and a third group in the center of the series which slots throughout the most of their extents are staggered with relation to the slots of said first and second groups but have one end lapping said first and second groups in line longitudinally of said shutter so that in one position all of said slots are in full registry with said series of openings; and securing means for said shutter permitting adjustment of said shutter to various positions laterally of the base of said hopper to adjust the relative position of said openings and slots transversely of said openings.

6. A fertilizer spreader, comprising: a wheelbarrow of the conventional type including a body and handles, said body having side and bottom walls disposed to funnel materials therein to the lowermost bottom portion near the front of said body, said body having a large slot in said lowermost bottom portion extending from side to side of said body; a single hopper depending from said body under said slot, said hopper being elongated and extending the length of said slot; said hopper having discharge opening means in the base of said hopper distributed longitudinally thereof; a pair of independently-rotatable, vaned agitators positioned in said hopper at opposite sides of the middle thereof coaxially aligned on an axis extending longitudinally of said hopper from side to side of said wheelbarrow body; said body having a supporting wheel on each of the opposite sides rotatably mounted independently of each other and free to rotate at different speeds in turning movements of the wheelbarrow; and means connecting each agitator only to the wheel on its side to rotate therewith at a speed proportional to the speed of rotation of the associated wheel whereby said agitators are rotated independently of one another and will rotate at different speeds in turning movements of the wheelbarrow.

7. A spreader, comprising: a wheelbarrow body of conventional type having a body with side and bottom walls disposed to funnel material therein to the lowermost bottom portion near the front of said body, a hopper depending from said body under said lowermost bottom portion and being elongated to extend from side to side thereof and opening means in said lowermost bottom portion communicating with said hopper, the bottom surface of the base of said hopper being transversely curved and having a series of discharge openings therein distributed longitudinally of said base; an elongated, normally stationary, plate-like valving shutter disposed to cover the bottom surface of said hopper in the area of said discharge openings and having a matching curvature, securing means for said shutter permitting movement of the position of said shutter back and forth in directions making adjustment of position longitudinally and in directions making adjustment of position transversely of said hopper, said shutter having a series of openings fully registering with said discharge openings in a first position of said shutter, all of said openings in said shutter and hopper progressively and uniformly going out of alignment so as to decrease the effective common areas of the openings as said shutter is moved from said first position in directions effecting one of said adjustments of position, and said openings in said shutter and hopper changing in alignment as said shutter is moved from said first position effecting the other of said adjustments of position, in a first direction blocking the discharge openings in the end portions of said hopper and in the opposite direction blocking the discharge openings in the intermediate portion of said hopper.

8. In a spreader including a mobile body and a hopper thereon, the improvement, comprising: said hopper being elongated in a direction from side to side of said mobile body, the base of said hopper having a series of discharge openings distributed longitudinally thereof; an elongated, normally stationary, plate-like valving shutter disposed to cover said base of said hopper in the area of said discharge openings, securing means for said shutter permitting movement of the position of said shutter back and forth in directions making adjustment of position longitudinally and in directions making adjustment of position transversely of said hopper, said shutter having a series of openings fully registering with said discharge openings in a first position of said shutter, all of said openings in said shutter and hopper progressively and uniformly going out of alignment so as to decrease the effective common areas of the openings as said shutter is moved from said first position in directions effecting one of said adjustments of position, and said openings in said shutter and hopper changing in alignment as said shutter is moved from said first position effecting the other of said adjustments of position, in a first direction blocking the discharge openings in the end portions of said hopper and in the opposite direction blocking the discharge openings in the intermediate portion of said hopper.

References Cited in the file of this patent

UNITED STATES PATENTS

| | | |
|---|---|---|
| 11,032 | Davis | June 6, 1854 |
| 735,638 | Wickson | Aug. 4, 1903 |
| 1,492,267 | Renshaw | Apr. 29, 1924 |
| 1,829,627 | Bamford et al. | Oct. 27, 1931 |
| 2,495,906 | Porter | Jan. 31, 1950 |
| 2,511,514 | Rosselot | June 13, 1950 |
| 2,541,008 | Stahmer et al. | Feb. 6, 1951 |

FOREIGN PATENTS

| | | |
|---|---|---|
| 95,172 | Germany | Dec. 14, 1897 |